United States Patent
Leclerc et al.

(10) Patent No.: US 12,058,601 B2
(45) Date of Patent: Aug. 6, 2024

(54) ELECTRONIC PACKET SWITCHING BASED ON TRAFFIC PROPERTIES

(71) Applicant: Nokia Solutions and Networks Oy, Espoo (FI)

(72) Inventors: Brice Leclerc, Arpajon (FR); Olivier Marce, Palaiseau (FR)

(73) Assignee: Nokia Solutions and Networks Oy, Espoo (FI)

( * ) Notice: Subject to any disclaimer, the term of this patent is extended or adjusted under 35 U.S.C. 154(b) by 209 days.

(21) Appl. No.: 17/185,517

(22) Filed: Feb. 25, 2021

(65) Prior Publication Data
US 2022/0272604 A1 Aug. 25, 2022

(51) Int. Cl.
*H04W 40/26* (2009.01)
*H04L 45/12* (2022.01)
(Continued)

(52) U.S. Cl.
CPC ........... *H04W 40/26* (2013.01); *H04L 45/123* (2013.01); *H04L 47/283* (2013.01); *H04W 40/02* (2013.01)

(58) Field of Classification Search
None
See application file for complete search history.

(56) References Cited

U.S. PATENT DOCUMENTS 5,940,372 A * 8/1999 Bertin .................... H04L 45/00
370/400
6,594,268 B1 * 7/2003 Aukia ................... H04L 45/302
370/235
(Continued)

FOREIGN PATENT DOCUMENTS

CN 110009137 A * 7/2019 ............. G06F 17/18
WO WO-2016128179 A1 * 8/2016 ........... H04L 45/121
(Continued)

OTHER PUBLICATIONS

Nasrallah et al., "Ultra-Low Latency (ULL) Networks: A Comprehensive Survey Covering the IEEE TSN Standard and Related ULL Research," downloaded from https://arxiv.org/pdf/1803.07673.pdf on May 20, 2021, dated Sep. 24, 2018, 59 pages.
(Continued)

*Primary Examiner* — Marcus Smith
*Assistant Examiner* — Berhanu D Belete
(74) *Attorney, Agent, or Firm* — Tong, Rea, Bentley & Kim, LLC

(57) ABSTRACT

A node includes a deterministic path that conveys packets from input ports to output ports via a deterministic switch. The node also includes a statistical path that conveys packets from the input ports to the output ports via a statistical switch. A deterministic scheduler selectively enables the first path or the second path based on traffic properties that indicate whether the packets are in a stochastic flow or a deterministic flow. In some cases, the deterministic scheduler includes timing circuitry that determines an arrival time of a packet at an input port of a node and enabling circuitry that generates signaling that selectively enables a first path for conveying the packet via a deterministic switch or a second path for conveying the packet via a statistical switch. The selection is based on whether the arrival time indicates that the packet is in a stochastic flow or a deterministic flow.

15 Claims, 6 Drawing Sheets

(51) Int. Cl.
    *H04L 47/283*    (2022.01)
    *H04W 40/02*    (2009.01)

(56) References Cited

U.S. PATENT DOCUMENTS

| | | | | |
|---|---|---|---|---|
| 7,020,147 | B1* | 3/2006 | Amadon | H04L 12/2854 370/401 |
| 7,460,534 | B1* | 12/2008 | Bellenger | H04L 49/602 370/392 |
| 7,573,866 | B2* | 8/2009 | Nikolova | G01C 21/3492 370/351 |
| 7,831,970 | B2* | 11/2010 | Moore | H04L 47/50 718/102 |
| 8,477,616 | B1* | 7/2013 | Rogers | H04L 47/2416 370/252 |
| 8,520,520 | B2* | 8/2013 | Moore | H04L 47/10 370/235 |
| 10,535,256 | B1* | 1/2020 | Lim | G08G 1/096811 |
| 10,701,466 | B1* | 6/2020 | Leclerc | H04Q 11/0066 |
| 2002/0039349 | A1* | 4/2002 | Malaney | H04Q 11/0478 370/230.1 |
| 2003/0061017 | A1* | 3/2003 | Dotaro | H04L 41/145 703/14 |
| 2005/0117575 | A1* | 6/2005 | Konda | H04L 49/3045 340/2.21 |
| 2006/0291392 | A1* | 12/2006 | Alicherry | H04L 45/02 370/235 |
| 2008/0043768 | A1* | 2/2008 | Lopez | H04L 49/3027 370/412 |
| 2008/0317015 | A1* | 12/2008 | Beshai | H04L 49/15 370/386 |
| 2010/0150161 | A1* | 6/2010 | Saksena | H04L 45/124 370/400 |
| 2010/0309281 | A1* | 12/2010 | Lim | G02B 7/02 347/257 |
| 2016/0112308 | A1* | 4/2016 | Ficara | H04L 12/417 370/401 |
| 2017/0132544 | A1* | 5/2017 | Michel | G06Q 10/06313 |
| 2018/0060471 | A1* | 3/2018 | Foreman | G06F 30/367 |
| 2018/0103094 | A1* | 4/2018 | Wetterwald | H04L 67/01 |
| 2018/0152377 | A1* | 5/2018 | Wetterwald | H04W 40/04 |
| 2019/0014030 | A1* | 1/2019 | Thubert | H04W 40/02 |
| 2019/0349392 | A1* | 11/2019 | Wetterwald | H04L 43/0852 |

FOREIGN PATENT DOCUMENTS

| | | |
|---|---|---|
| WO | WO 2020/036911 A1 | 2/2020 |
| WO | WO 2021/005400 A1 | 1/2021 |

OTHER PUBLICATIONS

EP Search Report mailed in corresponding EP Patent Application No. 22153745.9 on Jul. 15, 2022, 9 pages.

* cited by examiner

ELECTRONIC PACKET SWITCHING BASED ON TRAFFIC PROPERTIES

CROSS-REFERENCE TO RELATED APPLICATIONS

This application is related to U.S. Pat. No. 10,701,466, filed on Apr. 12, 2019, which is incorporated herein by reference in its entirety.

BACKGROUND

Fifth Generation (5G) communication systems enable applications such as virtual reality, augmented reality, reliable remote operation of machines, factory automation, network-assisted routing of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. One key feature of 5G communication systems is Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Another key feature of 5G communication systems is that most of the signal processing is done in the network by cloud servers rather than close to the radio antennas that support wireless communication, e.g., with IoT devices. The cloud server architecture is referred to herein as Cloud Radio Access Network (C-RAN). The latency requirements for C-RAN are even more stringent: round trip time budgets are expected to be in the range of 200 to 500 microseconds (μs). Although described herein in the context of a 5G communication system, the C-RAN architecture is also implemented in other communication systems such as Fourth Generation (4G) communication systems. A third key feature of 5G communication systems is network slicing, which permits operators to allocate resources of all types (network, CPU, storage) to a given service, without interfering with other services provided by the system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
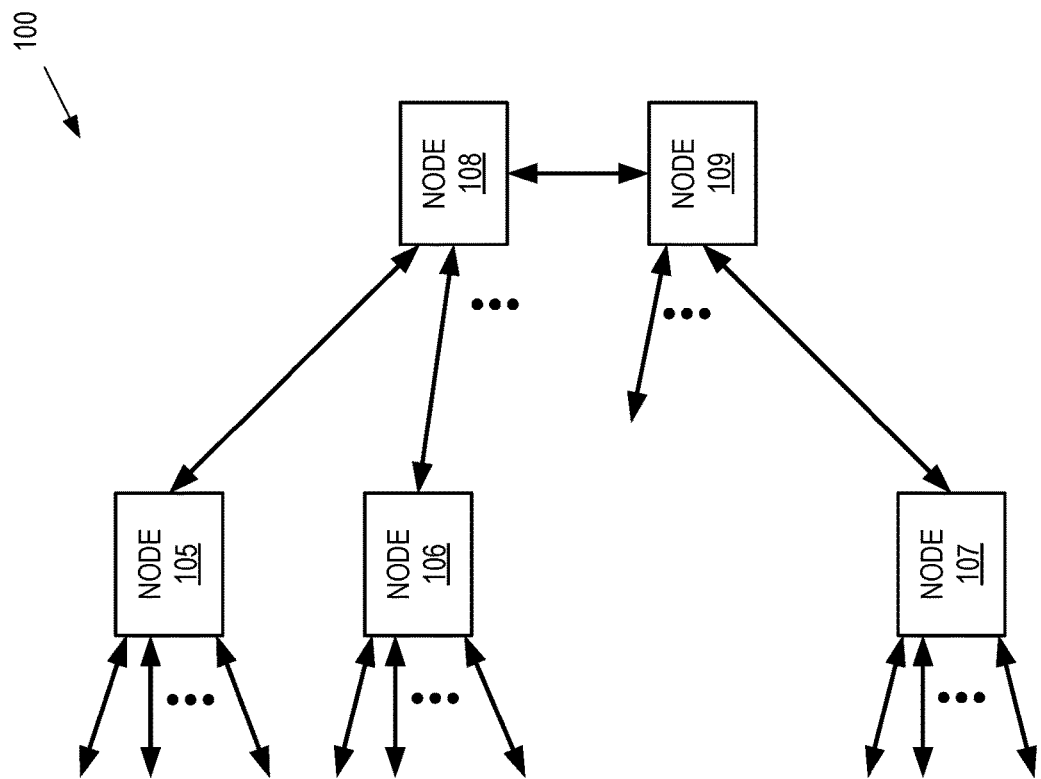
FIG. 1 is a block diagram of a communication system according to some embodiments.
Figure 1:
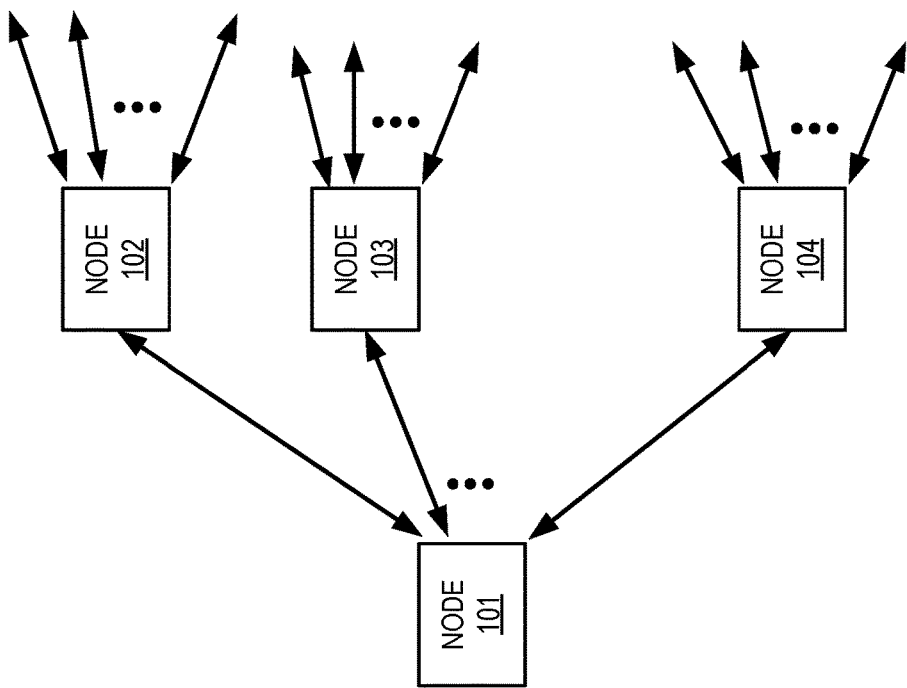

Traffic flows in a 4G or 5G network can be stochastic or deterministic. As used herein, the term "stochastic" refers to traffic flows that include packets that arrive at times that are not known in advance and with unknown latencies. Stochastic traffic flows therefore typically require extensive buffering and contention resolution to avoid packet collision and loss. In contrast, the packet arrival times and latencies are known accurately in advance for packets in "deterministic" traffic flows. Deterministic networking is therefore used to meet the stringent latency requirements of ULLRC and C-RAN. One deterministic networking technique is time-aware shaping of packets that are scheduled for transmission by a transmission scheduler that selects packets for scheduling from a set of ingress queues. A gate control list (GCL) identifies the ingress queues that are considered by the transmission scheduler in a sequence of time intervals that are referred to as traffic windows. The pattern of ingress queues that are considered in each traffic window is referred to as a gate control entity (GCE). The GCL is therefore a list of GCEs for the sequence of traffic windows. Different flows are mapped to different ingress queues. The GCL defines time-aware traffic windows in which only packets from ingress queues corresponding to specified flows are transmitted. For example, the GCL can be configured so that only a first queue associated with a first flow is considered by the scheduler in a time window that corresponds to the time that a first frame in the first flow is expected to arrive in the first queue. All other queues are closed by the GCL in that time window. The scheduler then schedules the only available frame—the first frame in the first queue—for transmission, thereby avoiding collisions and the resulting transmission delays.

Conventional packet switches in a mesh network perform dynamic routing of stochastic traffic based on information in the headers of arriving packets. The node parses the header of arriving packet and uses the information in the header to make and execute a local scheduling decision that directs packets received on an input port to an output port of the packet switch. Address resolution and contention resolution are performed at the input ports and additional contention resolution is performed at the output ports. Packet loss is avoided using a set of buffers implemented in the packet switch and packets are only discarded as a last resort, e.g., due to buffer overflow. In some cases, the packet switches are optical switches for routing optical signals through an optical network such as the optical fiber infrastructure deployed in metropolitan, regional, national, or international areas. Conventional optical transmission and switching are performed in an optical network using wavelength division multiplexing (WDM). Optical switching in a WDM-based network uses optical-to-electrical-to-optical (OEO) conversion, in which an optical switch receives an optical signal, converts the optical signal to an electrical (digital) signal, determines routing information based on the digital signal, and converts the electrical signal back to an optical signal for subsequent transmission. One alternative is optical packet switching (OPS) that allows an optical switch to route an input optical packet to an optical output port without converting the entire packet into an electrical/digital signal. In some cases, an optical header is converted into a digital signal that includes information used to configure the optical switch to route an optical payload without converting the optical payload into an electrical/digital signal. Examples of optical switches are disclosed in U.S. Pat. No. 10,701,466, filed on Apr. 12, 2019, which is incorporated herein by reference in its entirety.

Packet switches can, in principle, handle routing of deterministic traffic. However, conventional packet switching introduces several drawbacks that tend to defeat the purpose of deterministic networking. Processing of the header in conventional packets requires many clock cycles and the clock frequency becomes a bottleneck when the datagram rate (e.g., the number of packets that are processed per second) is high, such as on links that operate at 1 terabit (Tb) per second or more. A significant portion of the electrical energy is dissipated by the Joule effect, which may not be sustainable at very high datagram rates, such as 10 Tb per second. Furthermore, both the header and payload of the packet are buffered, which introduces additional energy consumption, latency, and jitter. Optical switches that use OEO conversion consume a significant amount of energy to perform the conversion and require a significant amount of time, which increases latency and leads to electronic bottlenecks. The conventional packet switch implements a statistical scheduler for scheduling transmission of the packets and performs functions such as contention resolution that are unnecessary for deterministic traffic and therefore unnecessarily consume time and energy.

FIGS. 1-6 disclose embodiments of a packet switch that includes a first path from one or more input ports to one or more output ports via a deterministic switch and a second path from the input ports to the output ports via a statistical switch. Packets arriving at the one or more input ports are selectively routed to the first path or the second path based on traffic properties that indicate whether the packets are in a stochastic flow or a deterministic flow. In some embodiments, the second path also includes the deterministic switch, which receives the packets in the stochastic flow from the statistical switch. A switching pattern for deterministic packets is determined based on a reception time interval for the packets. The switching pattern can be periodic or aperiodic. The deterministic switch routes the packets from the input ports to a predetermined output indicated by the switching pattern for the reception time interval of the packets. Consequently, control plane processing is not performed on packets that traverse the first path and no buffering of the packets is performed on the first path. In contrast, the statistical switch performs significant buffering and control plane processing. For example, the statistical switch reads a header or label of the packets in the stochastic flow that traverse the second path. The statistical switch performs a local scheduling and dynamic routing decision based on the information in the header or label and uses this information to route the packets from the input ports to the output ports. The statistical switch also performs address and contention resolution for the packets in the stochastic flow. Some embodiments of the statistical switch are disabled during reception time intervals allocated to deterministic flows. Stochastic traffic forwarding is then performed in time intervals that are not allocated to the deterministic flow. In some embodiments, differential buffers are included to account for different clock speeds in an input domain and output domain of the packet switch. In response to a deterministic packet arriving during an actual clock cycle, circuitry can compare the actual clock cycle to a planned clock cycle for reception of the deterministic packet and corrective actions can be performed to resolve any discrepancies. In some embodiments, the deterministic scheduler uses the same clock as the input ports in the input domain to avoid clock shifts and phase issues when selectively enabling the first path and in the comparison of the actual and planned clock cycles of reception of a deterministic packet.

FIG. 1 is a block diagram of a communication system 100 according to some embodiments. The communication system 100 includes a set of interconnected nodes 101, 102, 103, 104, 105, 106, 107, 108, 109, which are collectively referred to herein as "the nodes 101-109." Some embodiments of the nodes 101-109 are implemented as optical nodes. The connections or links between the nodes 101-109 convey packets in the form of electrical, optical, or photonic signals transmitted between the nodes 101-109. Some embodiments of the communication system 100 are therefore implemented using optical fibers to interconnect the nodes 101-109.

The nodes 101-109 include digital switches that are used to route packets from a source node to a destination node via one or more transit nodes. Some embodiments of the nodes 101-109 include optical elements such as optical-electrical-optical (OEO) conversion circuits, optical amplifiers, lasers, light-emitting diodes (LEDs), multiplexers, and the like, although these elements are not shown in FIG. 1 in the interest of clarity. The communication system 100 can be implemented as a mesh network, a ring network, or other network architecture.

The nodes 101-109 provide different switching paths for stochastic traffic and deterministic traffic. Arrival times of the packets that are part of deterministic flows are known in advance and so the nodes 101-109 are preconfigured to treat packets as deterministic if they arrive during time intervals that include the known arrival times for one or more packets of deterministic flows. Packets that arrive outside of the known arrival times for the deterministic flows are treated as stochastic traffic. Some embodiments of the nodes 101-109 include a deterministic path that conveys packets from input ports to output ports via a deterministic switch and a statistical path that conveys packets from the input ports to the output ports via a statistical switch. A deterministic scheduler in the nodes 101-109 selectively enables the first path or the second path based on traffic properties that indicate whether the packets are in a stochastic flow or a deterministic flow. In some cases, the deterministic scheduler includes timing circuitry that determines an arrival time of a packet at an input port of a node and enabling circuitry that generates signaling that selectively enables a first path for conveying the packet via a deterministic switch or a second path for conveying the packet via a statistical switch. The selection is based on whether the arrival time indicates that the packet is in a stochastic flow or a deterministic flow.

Figure 2:
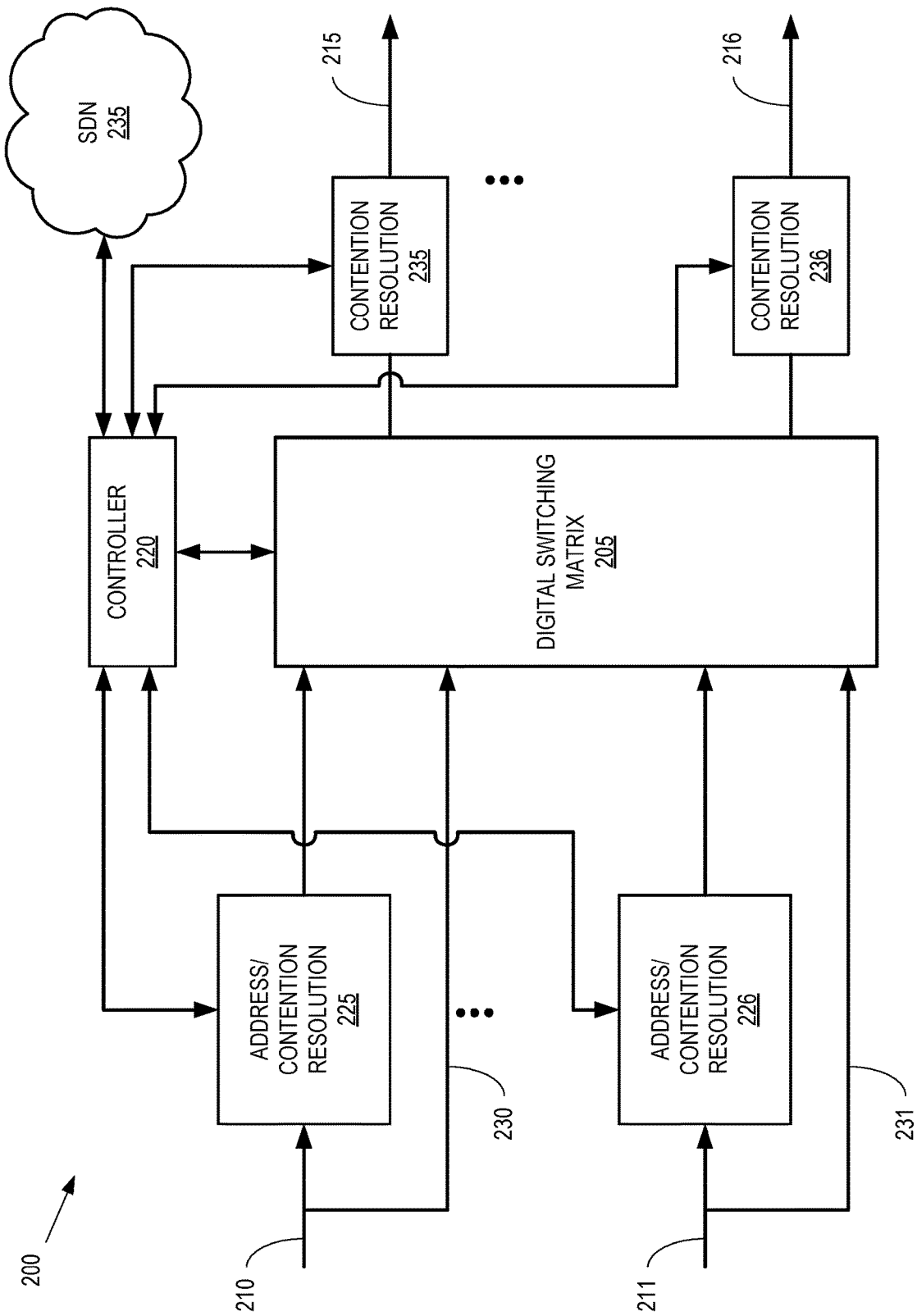
FIG. 2 is a block diagram of a node that performs conventional digital switching of packets.

FIG. 2 is a block diagram of a node 200 that performs conventional digital switching of packets. The node 200 includes a digital switching matrix 205 that routes packets from input ports 210, 211 of the node 200 to output ports 215, 216 of the node 200. Although two input ports 210, 211 and two output ports 215, 216 are shown in FIG. 2, some embodiments of the node 200 include more or fewer input ports and more or fewer output ports. The digital switching matrix 205 is configured using configuration information received from a controller 220. The digital switching matrix 205 then performs dynamic routing overriding packets based on information included in the packets. For example, the digital switching matrix 205 can examine the header of an arriving packet and based on the information retrieved from the header, the digital switching matrix 205 makes and executes a local scheduling decision to route the packet between the input ports 210, 211 and the output ports 215, 216. The digital switching matrix 205 also buffers the packets to avoid packet loss. Packets are therefore only discarded as a last resort.

The node 200 also includes digital processing circuitry 225, 226, 235, 236 to perform address and contention resolution for packets received on the corresponding input ports 210, 211. The digital processing circuitry 225, 226, 235, 236 is implemented using one or more processors, application-specific integrated circuits (ASICs), field-programmable gate arrays (FPGAs), and the like. Some embodiments of the digital processing circuitry 225, 226 use OEO conversion of at least a portion of the packet from an optical format to a digital format. For example, the digital processing circuitry 225, 226 can convert an optical header of an optical packet into an electrical (digital) format. Addressing information including a source and destination addresses or labels for the optical packet are extracted from the digital version of the optical header. The digital processing circuitry 225, 226 performs address resolution for the packet using the extracted addressing information. The digital processing circuitry 225, 226 then generates and provides configuration information to the controller 220, which uses the configuration information to configure or modify the digital switching matrix 205 based on the configuration information. The digital switching matrix 205 is configured so that the packet (or portion thereof) that is received from the digital processing circuitry 225, 226 is routed to the appropriate output port 215, 216 indicated in the configuration information.

Some embodiments of the digital processing circuitry 225, 226, 235, 236 also perform contention resolution using the information extracted from the packet. For example, the digital processing circuitry 225 can use information extracted from a packet to determine that the packet uses the same resources of the digital switching matrix 205 as another stochastic packet (or a packet from a deterministic flow) that is concurrently processed by the digital processing circuitry 226. Contention can occur between two (or more) packets in a stochastic flow or between a packet in a stochastic flow and a packet in a deterministic flow, e.g., the stochastic and deterministic packets can be contending on the output port 215. The digital processing circuitry 225, 226, 235, 236 generates configuration information including information relative to the contention between the packets. The configuration information is provided to the controller 220, which uses the configuration information to generate control signaling for the digital processing circuitry 225, 226, 235, 236 that then performs contention resolution based on the control signaling. The controller 220 also uses the configuration information to generate the information that configures or modifies the digital switching matrix 205 so that the configuration of the digital switching matrix 205 is consistent with the contention resolution.

Based on the control signals provided by the controller 220, the digital processing circuitry 235, 236 performs contention resolution for the two packets that are contending for the same resources. For example, buffering can be used to delay one of the packets and, in the case of optical packets, wavelength conversion can be used to switch one of the packets to a different optical channel or subchannel or deflection routing to route the two packets to different output ports 215, 216. In some cases, the digital processing circuitry 225, 226, 235, 236 therefore uses the results of the contention resolution in combination with the extracted addresses to generate the configuration information that is used to configure the digital switching matrix 205. In some embodiments, a software-defined network (SDN) 235 provides configuration information to the controller 220.

Figure 3:
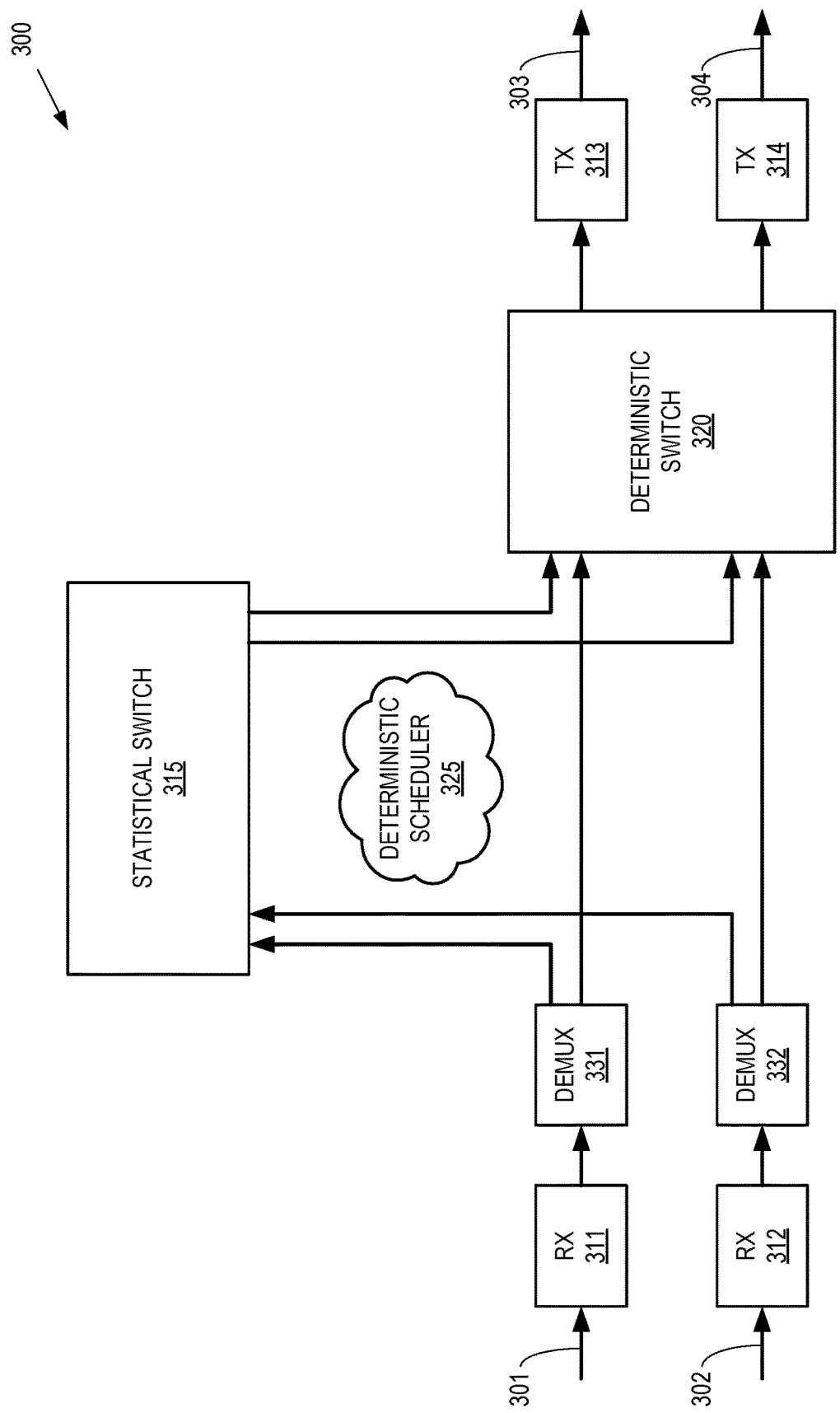
FIG. 3 is a block diagram of a node that selectively enables a statistical path and a deterministic path based on traffic properties of received packets according to some embodiments.

FIG. 3 is a block diagram of a node 300 that selectively enables a statistical path and a deterministic path based on traffic properties according to some embodiments. The node 300 is used to implement some embodiments of the nodes 101-109 shown in FIG. 1. The node 300 includes input ports 301, 302 and output ports 303, 304 that are associated with corresponding transceivers 311, 312, 313, 314 which are collectively referred to herein as "the transceivers 311-314." The transceivers 311-314 can be implemented as a single, integrated device or as separate transmitters (TX) and receivers (RX).

The node 300 supports a first set of paths from the input nodes 301, 302 to the output nodes 303, 304 via a statistical switch 315. The statistical switch 315 is implemented using some embodiments of the digital switching matrix 205 shown in FIG. 2. As discussed herein, the statistical switch 315 performs address and contention resolution for processing of traffic that does not have a known arrival time or reception time, e.g., stochastic traffic. The statistical switch 315 therefore schedules and dynamically routes the traffic locally based on information carried in packet headers.

The node 300 supports a second set of paths from the input nodes 301, 302 to the output nodes 303, 304 via a deterministic switch 320. The deterministic switch 320 is configured using information such as a switching pattern for deterministic packets in a deterministic flow. The switching pattern can indicate a mapping between the input ports 301, 302 and the output ports 303, 304. In some embodiments, an SDN such as the SDN 235 shown in FIG. 2 provides the configuration information that is used to preconfigure the deterministic switch 320.

A deterministic scheduler 325 selectively enables the first set of paths or the second set of paths based on traffic properties that indicate whether packets or flows are stochastic packets/flows or deterministic packets/flows. In some embodiments, the traffic property is an arrival time (or reception time) of a packet at the node 300. Packets in a deterministic flow arrive at the node 300 at predetermined arrival times, such as arrival times within a predetermined time interval. Since the arrival times of the packets are known, deterministic flows are distinguished from stochastic flows based on their arrival times. For example, packets that arrive at the input port 301 of the node 300 within a first set of time intervals associated with the deterministic flow are treated as deterministic packets (even if they are stochastic packets) and packets that arrive at the input port 301 of the node 300 within a second set of time intervals (mutually exclusive to the first set) are treated as stochastic packets. In some embodiments, different sets of time intervals are determined for different input ports 301, 302 of the nodes 300. Different time intervals can also be associated with different wavelengths of optical packets that are received at a particular input port of the node 300. Thus, the time intervals for different input ports (or different wavelengths in the case of optical nodes) do not need to be the same.

Prior to the beginning of a time interval in the first set, the deterministic scheduler 325 provides configuration information to a set of demultiplexers 331, 332 that selectively route packets received from the transceivers 311, 312 to either the statistical switch 315 or the deterministic switch 320. In some embodiments, packets that arrive at the input ports 301, 302 during the first set of time intervals (which are not necessarily the same for the input ports 301, 302) are routed from the demultiplexers 331, 332 directly to the deterministic switch 320, bypassing the statistical switch 315. These packets are routed through the deterministic switch 320 to the output ports 303, 304 based on the configuration information that was previously used to configure the deterministic switch 320. Thus, the packets in the deterministic flow are received and transmitted without resorting to a centralized control plane.

Packets that arrive at the input ports 301, 302 during the second set of time intervals (which are not necessarily the same for the input ports 301, 302) are treated as stochastic traffic and routed using information extracted from the packets by statistical switch 315, as discussed above. Alternatively, some embodiments of the node 300 monitor a local, out-of-band, control channel associated with the incoming stochastic packets. The control channel is used to convey routing information for the stochastic packets. In some embodiments, packets that are processed by the statistical switch 315 are then provided to the deterministic switch 320 for routing to the output ports 303, 304. In some embodiments, the second set of paths and the statistical switch 315 are disabled during the first set of time intervals, e.g., during the time intervals in which the deterministic scheduler 325 is configured to process planned or scheduled datagrams from a deterministic flow. In some embodiments, the statistical switch 315 does not process the datagrams it receives at the times associated with the deterministic traffic, e.g., as indicated by information provided by the deterministic scheduler 325. The statistical scheduler 315 solves stochastic traffic contention and forwards stochastic traffic in timeslots that are not reserved for deterministic traffic. In some embodiments, the statistical scheduler 315 computes some optimizations and solves contention issues in advance even if the statistical scheduler 315 does not forward stochastic traffic during the timeslots that are reserved for deterministic traffic.

Figure 4:
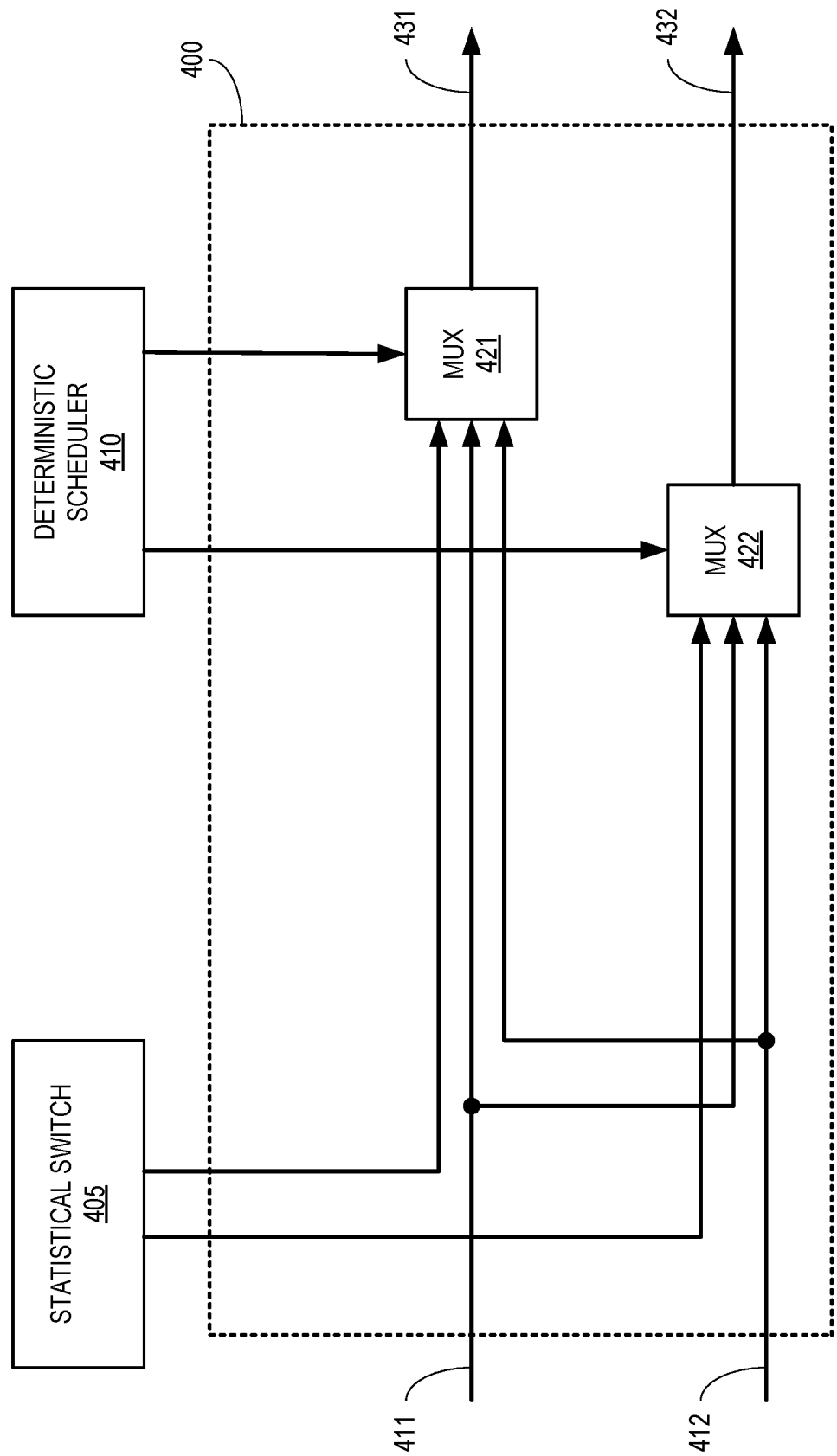
FIG. 4 is a block diagram of a deterministic switch according to some embodiments.

FIG. 4 is a block diagram of a deterministic switch 400 according to some embodiments. The deterministic switch 400 is used to implement some embodiments of the deterministic switch 320 shown in FIG. 3. In the illustrated embodiment, the deterministic switch 400 receives stochastic packets from a statistical switch 405 such as the statistical switch 315 shown in FIG. 3. A deterministic scheduler 410 (such as the deterministic scheduler 325 shown in FIG. 3) provides signaling that selectively enables paths for stochastic flows and deterministic flows. Deterministic packets in a deterministic flow are received on the input ports 411, 412 during the predetermined time intervals. In the illustrated embodiment, the statistical switch 405 provides stochastic packets to multiplexers 421, 422 and the deterministic packets are provided to the multiplexers 421, 422 via the ports 411, 412.

The signaling generated by the deterministic scheduler 410 selects the inputs from the multiplexers 421, 422 that are provided to the output ports 431, 432 of the deterministic switch 400. The signaling is used to configure the multiplexers 421, 422 so that packets arriving at the multiplexers 421, 422 from 411, 412 are provided directly to the output ports 431, 432 of the deterministic switch 400 during the time intervals that are allocated for deterministic flows and so that packets arriving at the multiplexers 421, 422 from the statistical switch are provided directly to the output ports 431, 432 of the deterministic switch 400 during the time intervals that are allocated for statistical flows. Some embodiments of the deterministic scheduler 410 compare the actual reception time of packets and the time intervals that are allocated for deterministic flows to detect clock shifts or inconsistencies and to manage corrective actions based on the detected clock shifts or inconsistencies. The deterministic scheduler 410 also determines the mapping of the input ports 411, 412 to the output ports 431, 432. For example, the signaling generated by the deterministic scheduler 410 can map the input port 411 to the output port 431 or the output port 432. The input port 412 can be mapped to the output port 431 or the output port 432.

Figure 5:
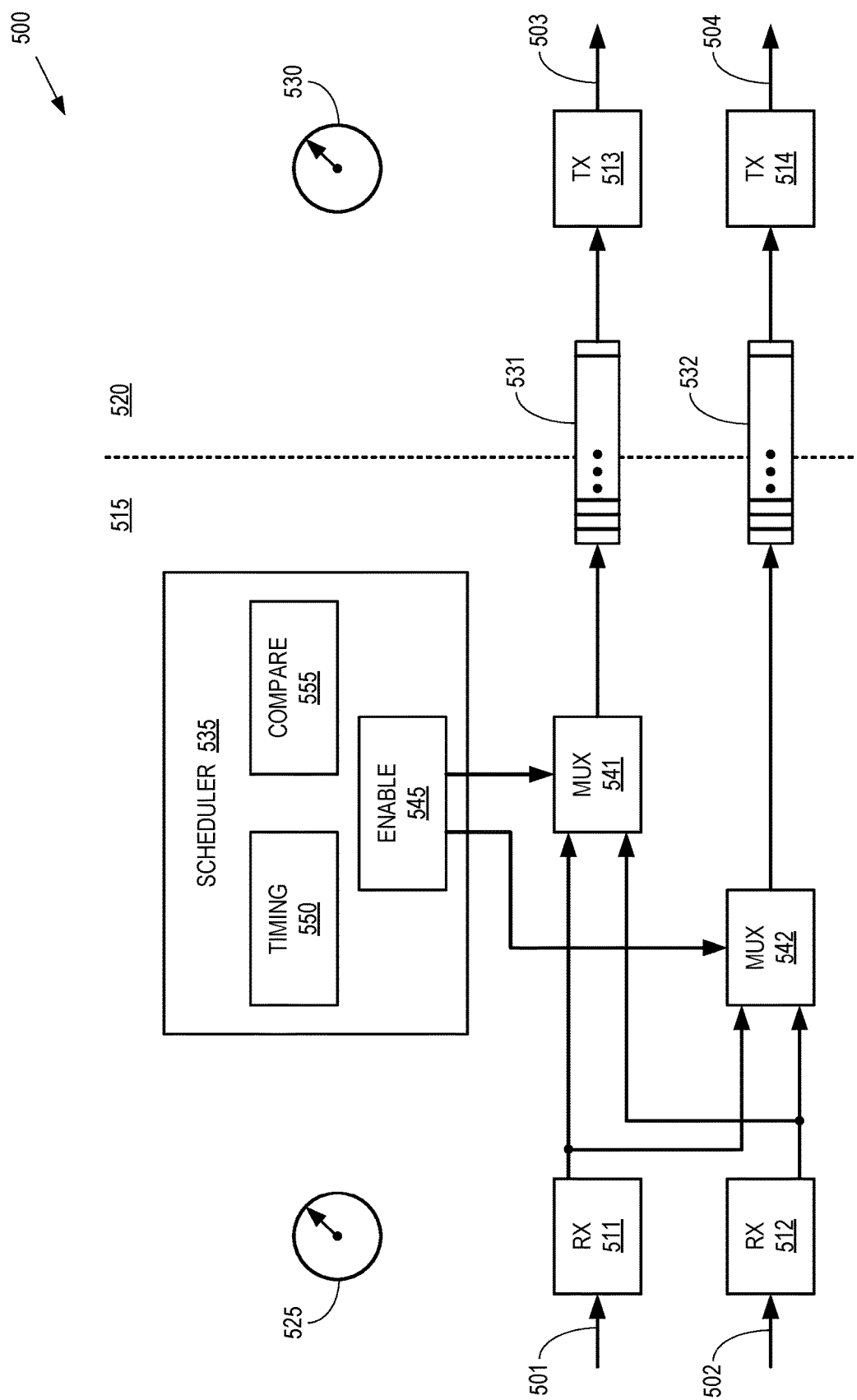
FIG. 5 is a block diagram of a node that selectively enables a statistical path and a deterministic path that traverse multiple time domains according to some embodiments.

FIG. 5 is a block diagram of a node 500 that selectively enables a statistical path and a deterministic path that traverses multiple time domains according to some embodiments. The node 500 is used to implement some embodiments of the nodes 101-109 shown in FIG. 1 and the node 300 shown in FIG. 3. The node 500 includes input ports 501, 502 and output ports 503, 504 that are associated with corresponding transceivers 511, 512, 513, 514 which are collectively referred to herein as "the transceivers 511-514." The transceivers 511-514 can be implemented as a single, integrated device or as separate transmitters (TX) and receivers (RX). Although not shown in FIG. 5 in the interest of clarity, the node 500 also includes a statistical switch such as the statistical switch 315 shown in FIG. 3 and a deterministic switch such as the deterministic switch 320 shown in FIG. 3.

The node 500 is partitioned into multiple time domains including an input time domain 515 and an output time domain 520. Timing in the input time domain 515 is provided by clock circuitry 525 and timing in the output time domain 520 is provided by the clock circuitry 530. Differential buffers 531, 532 are included in the paths between the input ports 501, 502 and the output ports 503, 504 to compensate for differences in the timing or speed between the input domain 515 and the output domain 520. In some embodiments, the depths of the differential buffers 531, 532 are determined based on a difference between an input link speed associated with the input ports 501, 502 and an output link speed associated with the output ports 503, 504. The differential buffers 531, 532 can also be used to compensate for different phasing between the input ports 501, 502 and the output ports 503, 504, which enables the node 500 to operate asynchronously A deterministic scheduler 535 selectively enables multiple paths through the node 500 via signaling provided to multiplexers 541, 542, as discussed herein. Some embodiments of the deterministic scheduler 535 include enabling circuitry 545 that generates signaling that selectively enables first or second paths for conveying packets between the input ports 501, 502 and the output ports 503, 504 via a deterministic switch or a statistical switch, respectively. The deterministic scheduler 535 makes the selection based on whether an arrival time or reception time of the packet falls within a time window for a deterministic flow. Some embodiments of the deterministic scheduler 535 include timing circuitry 550 that determines arrival or reception times of packets at the input node 501, 502. The deterministic scheduler 535 enables the first path during a first reception time interval allocated to the deterministic flows or enables the second path during a second reception time interval allocated to stochastic flows.

Some embodiments of the deterministic scheduler 535 include comparison circuitry 555 that compares an actual clock cycle for arrival of the deterministic packet (e.g., as determined by the timing circuitry 550 using the clock 525) to a planned clock cycle for reception of the deterministic packet. The planned clock cycle is the predetermined time (or time interval) that is reserved for transmitting deterministic packets through the node 500. In response to detecting a discrepancy, such as a difference between the actual and planned clock cycles that exceeds a threshold value, the deterministic scheduler 535 performs corrective actions to resolve the discrepancy between the actual clock cycle and the planned clock cycle. Although the deterministic scheduler 535 is shown as part of the input timing domain 515 in FIG. 5, the deterministic scheduler 535 is implemented as part of the output timing domain 520 in other embodiments.

Figure 6:
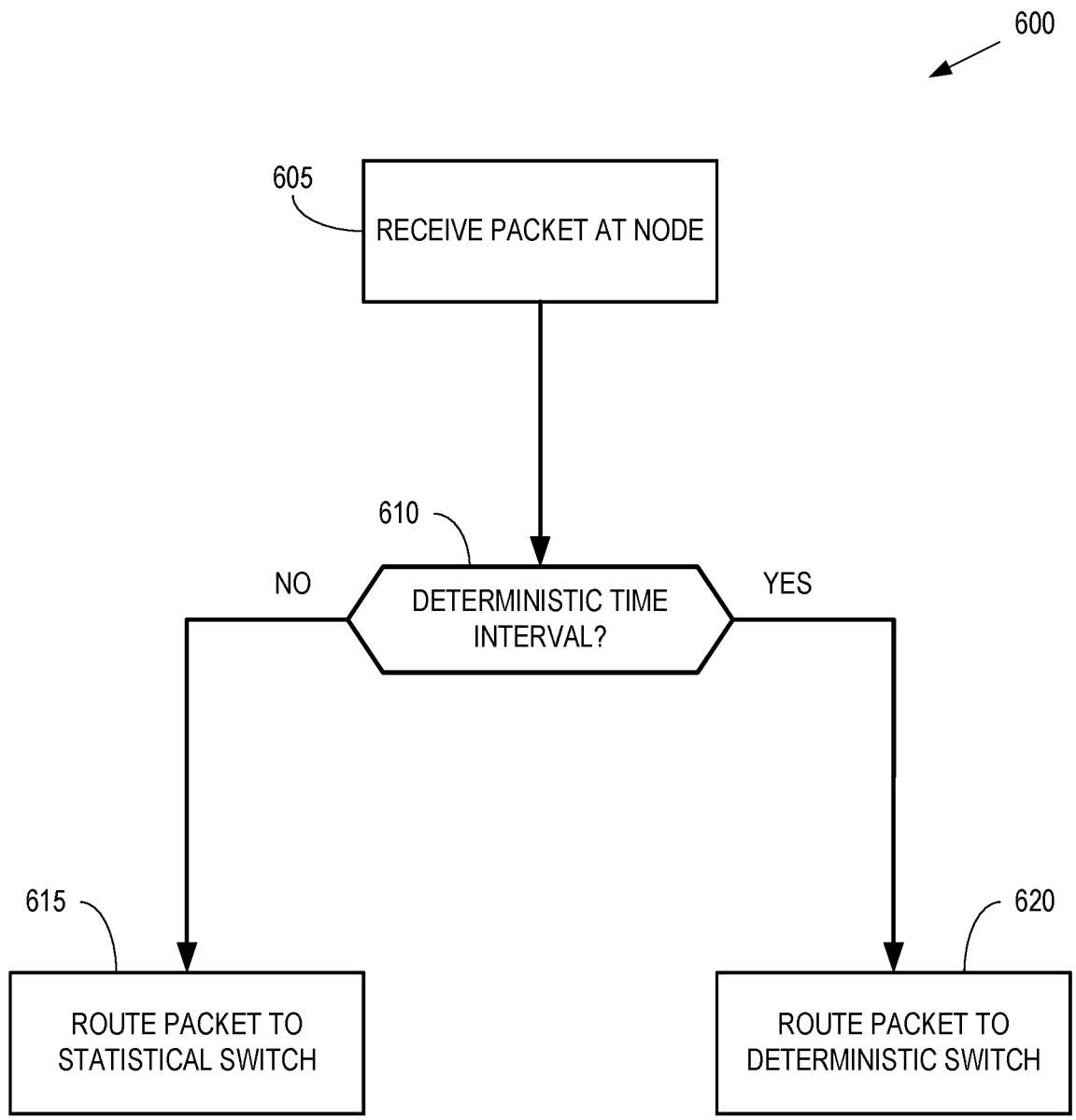
FIG. 6 is a flow diagram of a method of selectively routing packets along statistical paths or deterministic paths based on traffic properties according to some embodiments.

FIG. 6 is a flow diagram of a method 600 of selectively routing packets along statistical paths or deterministic paths based on traffic properties according to some embodiments. The method 600 is implemented in some embodiments of the nodes 101-109 shown in FIG. 1, the node 300 shown in FIG. 3, and the node 500 shown in FIG. 5. At block 605, the node receives a packet in a flow. At decision block 610, the node determines whether the traffic properties associated with the packet indicate that the packet is part of a stochastic flow or a deterministic flow. In the illustrated embodiment, the traffic property assessed by the node is the arrival or reception time of the packet. If the arrival or reception time is not within a deterministic time interval, which indicates that the packet should be treated as a stochastic packet, the method 600 flows to the block 615 and the node routes the packet to a statistical switch. If the arrival or reception time is within the deterministic time interval, which indicates that the packet should be treated as a deterministic packet, the method 600 flows to the block 620 and the node routes the packet to a deterministic switch.

Embodiments of the selected routing techniques disclosed herein have several advantages over conventional statistical processing of packets by switches in a node. Digital processing of the deterministic traffic flows is minimal, which reduces the latency for this traffic type. For example, latencies can be reduced to a single clock cycle for deterministic packet switching. The actual switching latency is therefore 3.87 ns over 10 Gb per second ethernet links. The latency advantage is achieved at low cost and memory is saved because buffering is not needed for the deterministic flows. The techniques disclosed herein are also energy-efficient because deterministic traffic flows are not processed for address resolution or contention resolution. When selective enabling of statistical or deterministic paths is used in switches that have high data rate input links and output links, the address and contention resolution block can be offloaded to reduce the size of this element, which can be a data rate bottleneck in high-speed switches. Thus, more effective capacity can transit through the switch using electronic components of comparable complexity for address and content resolution. The packet size of the deterministic traffic flows is not limited by the amount of memory required to buffer the packets, which enables the use of larger packet sizes to reduce the end-to-end latency. Multiple packets can be aggregated into a single deterministic packet and transmitted over a network segment equipped with deterministic switches to reduce latency and jitter between entities in the network. Furthermore, the bandwidth allocated to deterministic flows cannot be used to perform, or be spoofed by, denial of service (DOS) attacks. Content checking of the deterministic flows can be performed by routing some packets to the statistical switch.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM) or other non-volatile memory device or devices, and the like. The executable instructions stored on the non-transitory computer-readable storage medium may be in source code, assembly language code, object code, or other instruction format that is interpreted or otherwise executable by one or more processors.

A computer-readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
   a) hardware-only circuit implementations (such as implementations and only analog and/or digital circuitry) and
   b) combinations of hardware circuits and software, such as (as applicable):
      i. a combination of analog and/or digital hardware circuit(s) with software/firmware and
      ii. any portions of a hardware processor(s) with software (including digital signal processor(s), software, and memory(ies) that work together to cause an apparatus, such as a mobile phone or server, to perform various functions) and
   c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A node comprising:
    at least one first path configured to convey packets from at least one input port to at least one output port via a deterministic switch;
    at least one second path configured to convey packets from the at least one input port to the at least one output port via a statistical switch; and
    a deterministic scheduler configured to selectively enable the at least one first path and the at least one second path based on traffic properties that indicate whether the packets are in a stochastic flow or a deterministic flow, wherein the traffic properties comprise a reception time of the packets at the at least one input port, wherein the at least one first path and the at least one second path are selectively enabled based on the reception times of the packets, wherein the deterministic scheduler is configured to enable the at least one first path in response to the reception times of the packets falling in a first reception time interval indicating that the packets are in the deterministic flow, wherein the deterministic scheduler is configured to enable the at least one second path in response to the reception times of the packets falling in a second reception time interval indicating that the packets are in the stochastic flow.

2. The node of claim 1, wherein the statistical switch in the at least one second path provides packets to the deterministic switch.

3. The node of claim 1, wherein the deterministic scheduler is configured to determine a switching pattern for deterministic packets in the deterministic flow in response to the deterministic packets being in the deterministic flow, the switching pattern indicating a mapping between the at least one input port and the at least one output port.

4. The node of claim 3, wherein the statistical switch buffers stochastic packets in the stochastic flow that are received along the second path, reads a header or label of the stochastic packets in the stochastic flow, performs local scheduling and dynamic routing based on information in the header or label, determines the mapping between the at least one input port and the at least one output port based on information in the header or label, and performs address and content resolution for the stochastic packets in the stochastic flow.

5. The node of claim 3, wherein the deterministic switch comprises:
    a first clock to provide timing to an input domain including the at least one input port;
    a second clock to provide timing to an output domain including the at least one output port; and
    at least one differential buffer to account for timing differences between the first clock and the second clock.

6. The node of claim 5, wherein the deterministic scheduler is configured to compare an actual clock cycle for arrival of the deterministic packet to a planned clock cycle for reception of the deterministic packet.

7. The node of claim 6, wherein the deterministic scheduler is configured to perform corrective actions to resolve discrepancies between the actual clock cycle and the planned clock cycle.

8. The node of claim 7, wherein the deterministic scheduler uses the first clock for comparison of the actual clock cycle and planned clock cycle of reception of deterministic packets.

9. A method comprising:
    receiving a packet at an input port of a node; and
    selectively routing the packet from the input port to an output port via a first path or a second path based on traffic properties that indicate whether the packet is in a stochastic flow or a deterministic flow, wherein the first path is configured to convey the packet from the input port to the output port via a deterministic switch and the second path is configured to convey the packet from the input port to the output port via a statistical switch, wherein selectively routing the packet from the input port to the output port via the first path or the second path based on the traffic properties comprises selectively routing the packet based on a reception time of the packet at the input port, wherein selectively routing the packet comprises routing the packet along the first path in response to the reception time of the packet falling in a first reception time interval indicating that the packet is in the deterministic flow or selectively routing the packet along the second path in response to the reception time of the packet falling in a second reception time interval indicating that the packet is in the stochastic flow.

10. The method of claim 9, further comprising:
    determining a switching pattern for deterministic packets in the deterministic flow in response to the deterministic packets being in the deterministic flow, the switching pattern indicating a mapping between the input port and the output port.

11. The method of claim 10, further comprising buffering, at the statistical switch, stochastic packets in the stochastic flow that are received along the second path, reading a header or label of the stochastic packets in the stochastic flow, performing local scheduling and dynamic routing based on information in the header or label, determining the mapping between the input port and the output port based on information in the header or label, and performing address and content resolution for the stochastic packets in the stochastic flow.

12. The method of claim 10, further comprising:
    providing packets received at the input port to a differential buffer to account for timing differences between a first clock that provides timing to an input domain including the input port and a second clock that provides timing to an output domain including the output port.

13. The method of claim 12, further comprising:
comparing an actual clock cycle for arrival of the deterministic packet to a planned clock cycle for reception of the deterministic packet; and
performing at least one corrective action to resolve discrepancies between the actual clock cycle and the planned clock cycle.

14. An apparatus comprising:
timing circuitry configured to determine a reception time of a packet at an input port of a node; and
enabling circuitry configured to generate signaling that selectively enables a first path for conveying the packet from the input port to an output port via a deterministic switch or a second path for conveying the packet from the input port to the output port via a statistical switch, wherein the selection is based on whether the reception time indicates that the packet is in a stochastic flow or a deterministic flow, wherein the enabling circuitry is configured to enable the first path in response to the reception time of the packet falling in a first reception time interval indicating that the packet is in the deterministic flow, wherein the enabling circuitry is configured to enable the second path in response to the reception time of the packet falling in a second reception time interval indicating that the packet is in the stochastic flow.

15. The apparatus of claim 14, further comprising:
compare circuitry configured to compare an actual clock cycle for arrival of the packet in the deterministic flow to a planned clock cycle for reception of the packet and perform at least one corrective action to resolve discrepancies between the actual clock cycle and the planned clock cycle.

* * * * *